(12) United States Patent
Yun

(10) Patent No.: US 10,680,746 B2
(45) Date of Patent: Jun. 9, 2020

(54) DEMODULATION METHOD, DEVICE, TERMINAL AND SYSTEM

(71) Applicant: BAICELLS TECHNOLOGIES CO. LTD., Beijing (CN)

(72) Inventor: Xiang Yun, Beijing (CN)

(73) Assignee: Baicells Technologies Co., Ltd., Beijing (CN)

( * ) Notice: Subject to any disclaimer, the term of this patent is extended or adjusted under 35 U.S.C. 154(b) by 0 days.

(21) Appl. No.: 16/091,387

(22) PCT Filed: Apr. 5, 2017

(86) PCT No.: PCT/CN2017/079461
§ 371 (c)(1),
(2) Date: Oct. 4, 2018

(87) PCT Pub. No.: WO2017/173981
PCT Pub. Date: Oct. 12, 2017

(65) Prior Publication Data
US 2019/0089485 A1    Mar. 21, 2019

(30) Foreign Application Priority Data

Apr. 8, 2016 (CN) .......................... 2016 1 0218168

(51) Int. Cl.
*H04L 1/00* (2006.01)
*H04L 5/00* (2006.01)
(Continued)

(52) U.S. Cl.
CPC ........ *H04L 1/0038* (2013.01); *H04J 11/0069* (2013.01); *H04J 11/0073* (2013.01);
(Continued)

(58) Field of Classification Search
CPC .... H04L 1/0038; H04W 76/11; H04J 11/0069
See application file for complete search history.

(56) References Cited

U.S. PATENT DOCUMENTS

| 10,064,041 B2 * | 8/2018 | Seo .................... H04L 27/2607 |
| 2015/0172087 A1 | 6/2015 | Wang et al. |
| 2015/0358801 A1 | 12/2015 | Seo et al. |

FOREIGN PATENT DOCUMENTS

| CN | 102255831 A | 11/2011 |
| CN | 104717174 A | 6/2015 |
| CN | 104969488 A | 10/2017 |

OTHER PUBLICATIONS

International Search Report and Written Opinion for International Application No. PCT/CN2017/079461, dated Jun. 28, 2017 (Jun. 28, 2017)—11 pages; English Translation of Written Opinion—3 pages.

* cited by examiner

*Primary Examiner* — Chandrahas B Patel
(74) *Attorney, Agent, or Firm* — Culhane Meadows PLLC; Stephen J. Weed

(57) ABSTRACT

Various embodiments of the present disclosure provide a demodulation method, device, terminal, and system. The demodulation method includes: obtaining communication information of a cell; blindly demodulating a synchronization signal in the communication information to obtain a blind-demodulation result; determining time range information carried by the communication information according to the blind-demodulation result; and demodulating the communication information according to the time range information.

14 Claims, 5 Drawing Sheets

(51) Int. Cl.
*H04J 11/00* (2006.01)
*H04W 76/11* (2018.01)
*H04W 48/16* (2009.01)
*H04W 56/00* (2009.01)
*H04W 72/04* (2009.01)

(52) U.S. Cl.
CPC .......... *H04J 11/0076* (2013.01); *H04L 5/005* (2013.01); *H04L 5/0048* (2013.01); *H04W 48/16* (2013.01); *H04W 56/001* (2013.01); *H04W 72/0446* (2013.01); *H04W 72/0466* (2013.01); *H04W 76/11* (2018.02)

DEMODULATION METHOD, DEVICE, TERMINAL AND SYSTEM

CROSS-REFERENCE TO RELATED APPLICATION

This application is the U.S. national phase of PCT Application No. PCT/CN2017/079461 filed on Apr. 5, 2017, which claims the benefit of Chinese Patent Application No. 201610218168.9, filed on Apr. 8, 2016, the disclosure of these are incorporated herein in their entirety by reference.

TECHNICAL FIELD

The present disclosure relates to the field of radio communication technologies, and in particular, to a demodulation method, device, terminal, and system.

BACKGROUND

A mobile communication system refers to a system in which an operator provides communication services for a user terminal (such as a mobile phone) by deploying a radio access network device (such as a base station) and a core network device (such as a Home Location Register, HLR). The mobile communication system has experienced the first generation, the second generation, the third generation, and the fourth generation. The first generation of the mobile communication system refers to the original analog, voice-only cellular phone standard, which mainly using an access method of analog technology and Frequency Division Multiple Access (FDMA). The second generation of the mobile communication system introduces digital technology, which improves network capacity and improves voice quality and confidentiality. Representative of the second generation of the mobile communication system is Global System for Mobile Communication (GSM) and Code Division Multiple Access (CDMA IS-95). The third generation of the mobile communication system mainly refers to three technologies including CDMA2000, WCDMA, and TD-SCDMA, which all use code division multiple access as access technology. Standards of the fourth generation of the mobile communication system are internationally uniform, which are Long Term Evolution/Long Term Evolution-Advanced (LTE/LTE-A) developed by the International Organization for Standardization (3GPP), whose downlink is based on Orthogonal Frequency Division Multiple Access (OFDMA) and uplink is based on Single Carrier-Frequency Division Multiple Access (SC-FDMA), which achieves high-speed transmission with a downlink peak rate reaches 1 Gbps and an uplink peak rate reaches 500 Mbps based on a flexible bandwidth and an adaptive modulation and coding scheme.

Based on the LTE R13 LAA downlink transmission method, the MulteFire standard defines the uplink transmission method, and may independently work in an unlicensed frequency band through technical enhancement.

Since the MulteFire standard works in the unlicensed bands, Listen-Before-Talk (LBT) technology which is similar to WiFi is introduced to ensure coexistence of the MulteFire standard with other technologies for unlicensed bands (such as WiFi). In order to ensure that a Discovery Reference Signal (DRS) for synchronization has sufficient transmission opportunities under the condition of LBT, the MulteFire standard defines a Discovery Measurement Timing Configuration (DMTC). The DMTC is a periodic window in which a cell attempts to transmit the DRS. Specifically, a minimum transmission cycle of the DMTC is 40 ms, and the length of the transmission window is 1-10 ms, which is configured by the cell.

In order to enable the MulteFire standard to independently work in the unlicensed band, physical layer technologies are enhanced as follows.

I. Synchronization Signal

The synchronization signal mainly includes Primary Synchronization Signals (PSS), Secondary Synchronization Signals (SSS), enhanced Primary Synchronization Signals (ePSS), and enhanced Secondary Synchronization Signals (eSSS). The synchronization signal may be part of the DRS, that is, transmitted within the DMTC. When the synchronization signal is transmitted on subframes 0 to 4, a short code of the SSS is 0. When the synchronization signal is transmitted on subframes 5 to 9, the short code of the SSS is 1. The synchronization signal may also be transmitted on subframes 0 or 5 that are outside the DMTC. In each subframe, the PSS is transmitted on the 7th OFDM symbol, the SSS is transmitted on the 6th OFDM symbol, the ePSS is transmitted on the 4th OFDM symbol, and the eSSS is transmitted on the 3rd OFDM symbol. With the enhanced design, the synchronization signal may enable a user terminal to obtain time and frequency synchronization information by once demodulation at a lower signal to noise ratio. Specifically, a boundary position of the subframe may be obtained, but a subframe number and a system frame number may not be obtained.

II. Enhanced Physical Broadcast Channel

The MulteFire Physical Broadcast Channel (MF-PBCH) mainly broadcasts a Master Information Block (MIB). The MF-PBCH may be part of the DRS and may be sent in any subframe within the DMTC. Three bits in the MIB indicate a subframe offset relative to subframe 0 or subframe 5. The user terminal may obtain the subframe number by demodulating information of the 3 bits. The MF-PBCH may also be transmitted on subframe 0 other than the DMTC.

In addition, similar to the LTE system, the MIB also indicates 8-bit system frame number information. Other 2-bit information is obtained through a redundant RV version of the MF-PBCH. The user terminal may obtain the system frame number (SFN) by blindly demodulating the RV version of the MF-PBCH and the 8-bit information broadcasted in the MIB, and complete all synchronization operations. For the reliability at the time of demodulation, the MF-PBCH occupies a total of 6 OFDM symbols of 7, 8, 9, 10, 11, and 4 for transmission.

III. Enhance System Information Block (eSIB)

The enhanced system information block (eSIB) may be part of the DRS and may be sent in any subframe within the DMTC. Unlike other DRS which occupy dedicated pilot resources, the eSIB occupies PDSCH resources. The eSIB may also be transmitted on subframe 0 other than the DMTC.

In the unlicensed frequency band, the CRS and the MF-PBCH may be sent within the DMTC or outside the DMTC. Therefore, the transmission opportunity is more and flexible. As such, the user terminal usually encounters following scenarios when demodulating the CRS and the MF-PBCH:

Scenario 1: when the DRS is transmitted within the DMTC and if the DRS is transmitted on subframes 0~4, the CRS is scrambled with subframe 0. If the DRS is transmitted on subframes 5~9, the CRS is scrambled with subframe 5. The user terminal may obtain a channel estimation result of the system by demodulating the CRS, and then demodulate the result to obtain the MulteFire physical broadcast channel (MF-PBCH), the physical downlink control channel (PDCCH), and the corresponding physical downlink shared Channel (PDSCH). When unicast data is transmitted within the DMTC, the CRS is scrambled according to a subframe number transmitting the CRS. Since the user terminal does not know whether the DRS or the unicast data is transmitted within the DMTC, the user terminal needs to blindly demodulate the CRS using various scrambling assumptions, which greatly improves the complexity of the demodulation and increases power consumption.

Scenario 2: in the MulteFire standard, the MF-PBCH may be sent on any subframe within the DMTC or on subframe 0 that is outside the DMTC. There are four RV versions transmitted by the MF-PBCH: RV0, RV1, RV2, and RV3. When a cell transmits the MF-PBCH, a RV version of the MF-PBCH transmitted at the moment of SFN mod 4=x is RVx. However, before demodulating the MF-PBCH, the user terminal does not know whether this moment is within the DMTC, and does not know a corresponding SFN value. Therefore, as shown in FIG. 5A, the user terminal needs to blindly demodulate the MF-PBCH according to all RV versions at all moments, which improves the complexity of the demodulation and increases the power consumption.

That is to say, when demodulating the CRS and the MF-PBCH currently, various assumptions are required for demodulation, resulting in high demodulation complexity and increased power consumption.

SUMMARY

An object of the present disclosure is to provide a demodulation method, device, terminal, and system to solve a problem that in an unlicensed frequency band, the demodulation of information including a CRS and an MF-PBCH often has various assumptions, resulting in high demodulation complexity and increasing of the power consumption.

Various embodiments of the present disclosure provide a demodulation method, including: obtaining communication information of a cell; blindly demodulating a synchronization signal in the communication information to obtain a blind-demodulation result; determining time range information carried by the communication information according to the blind-demodulation result; and demodulating the communication information according to the time range information.

Various embodiments of the present disclosure provide a demodulation device, including: an obtaining module, configured to obtain communication information of a cell; a blindly-demodulating module, configured to blindly demodulate a synchronization signal in the communication information to obtain a blind-demodulation result; a determining module, configured to determine time range information carried by the communication information according to the blind-demodulation result; and a demodulating module, configured to demodulate the communication information according to the time range information.

Various embodiments of the present disclosure provide a terminal including the demodulation device described above.

Various embodiments of the present disclosure provide a demodulation system, including: a receiver, configured to obtain communication information of a cell; and a processor connected with the receiver, configured to blindly demodulate a synchronization signal in the communication information to obtain a blind-demodulation result, determine time range information carried by the communication information according to the blind-demodulation result, and demodulate the communication information according to the time range information.

Through the above technical solutions of the present disclosure, the beneficial effects of the present disclosure are described as follows.

In the above technical solutions, communication information of a cell is obtained, a synchronization signal in the communication information is blindly demodulated to obtain a blind-demodulation result, time range information carried by the communication information is determined according to the blind-demodulation result, and the communication information is demodulated according to the time range information. In this way, some conditions of the communication information of the cell may be determined according to the obtained prior information, thereby reducing assumptions when demodulating the communication information, reducing demodulation complexity and power consumption.

DETAILED DESCRIPTION

Hereinafter, technical solutions in embodiments of the present disclosure will be clearly and completely described with reference to the accompanying drawings. It is obvious that the described embodiments are a part of the embodiments of the present disclosure, and not all embodiments. All other embodiments obtained by a person skilled in the art based on the embodiments of the present disclosure without creative efforts belong to the protection scope of the present disclosure.

First Embodiment

Figure 1:
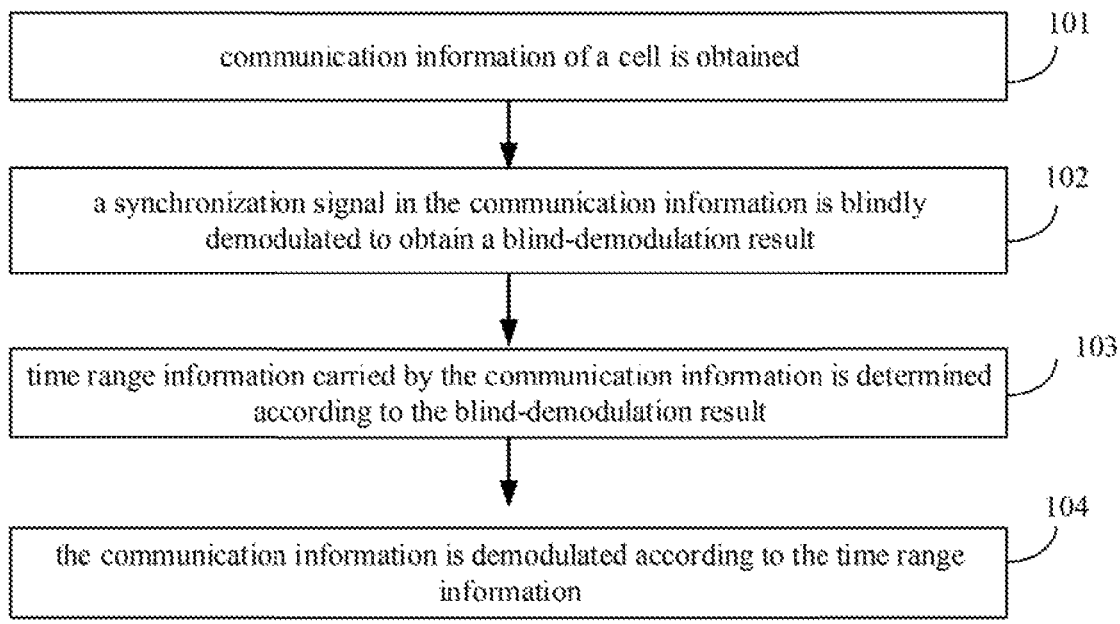
FIG. 1 is a flowchart illustrating a demodulation method according to a first embodiment of the present disclosure.

As shown in FIG. 1, the first embodiment of the present disclosure provides a demodulation method. The demodulation method includes operations at blocks 101 to 104, which are described in detail below.

At block 101, communication information of a cell is obtained.

In the embodiment of the present disclosure, the demodulation method is applied to, for example, a mobile phone terminal, a handheld device, a radio modem, etc., and may also be applied to other devices capable of transmitting or receiving radio signals. The communication information is information on an entire bandwidth obtained by a terminal operating in an unlicensed frequency band from the corresponding cell.

The communication information includes, for example, a synchronization signal, a reference signal, a broadcast signal, a control signal, a data signal, and the like.

At block 102, a synchronization signal in the communication information is blindly demodulated to obtain a blind-demodulation result.

In the embodiment of the present disclosure, the synchronization signal mainly includes a PSS, a SSS, an ePSS, and an eSSS. The synchronization signal may be part of the DRS, i.e., transmitted within the DMTC, or may be transmitted on subframe 0 that is outside the DMTC.

In each subframe, a position of the synchronization signal is fixed. In general, the synchronization signal is in an intermediate frequency domain position 6RB of the communication information.

Blindly demodulating the synchronization signal may determine some information of the corresponding cell, such as cell identification information, frequency information, etc., to reduce the complexity of subsequent demodulation.

At block 103, time range information carried by the communication information is determined according to the blind-demodulation result.

In the embodiment of the present disclosure, the time range information is, for example, a reference subframe number, a correspondence between the DMTC and the SFN, and the like. The time range information is prior information included in the communication information of the cell obtained at the foregoing block 101, and is information that is determined and unchanged.

At block 104, the communication information is demodulated according to the time range information.

Since the time range information is the information that is determined and unchanged, some conditions of the communication information may be determined according to the time range information, thereby reducing assumptions when demodulating the communication information, and reducing demodulation complexity.

In the demodulation method provided by the embodiment of the present disclosure, communication information of a cell is obtained, a synchronization signal in the communication information is blindly demodulated to obtain a blind-demodulation result, time range information carried by the communication information is determined according to the blind-demodulation result, and the communication information is demodulated according to the time range information. In this way, some conditions of the communication information of the cell may be determined according to the obtained prior information, thereby reducing assumptions when demodulating the communication information, reducing demodulation complexity and power consumption.

Second Embodiment

Figure 2:
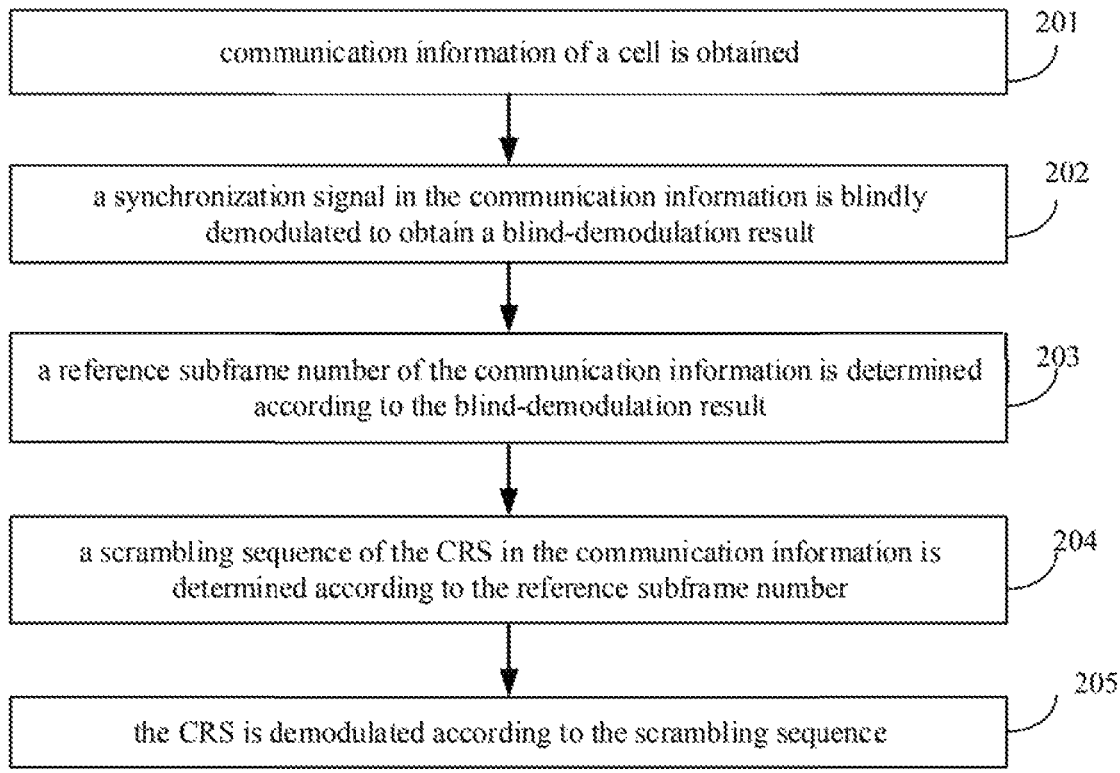
FIG. 2 is a flowchart illustrating a demodulation method according to a second embodiment of the present disclosure.

As shown in FIG. 2, the second embodiment of the present disclosure provides a demodulation method. The demodulation method includes operations at blocks 201 to 205, which are described in detail below.

At block 201, communication information of a cell is obtained.

In the embodiment of the present disclosure, the demodulation method is applied to, for example, a mobile phone terminal, a handheld device, a radio modem, etc., and may also be applied to other devices capable of transmitting or receiving radio signals. The communication information is information on an entire bandwidth obtained by a terminal operating in an unlicensed frequency band from the corresponding cell.

At block 202, a synchronization signal in the communication information is blindly demodulated to obtain a blind-demodulation result.

In the embodiment of the present disclosure, the synchronization signal mainly includes a PSS, a SSS, an ePSS, and an eSSS. The synchronization signal may be part of the DRS, i.e., transmitted within the DMTC. When the synchronization signal is transmitted on subframes 0~4, a short code of the SSS is 0. When the synchronization signal is transmitted on subframes 5~9, the short code of the SSS is 1. The synchronization signal may also be transmitted on subframes 0 or 5 that are outside the DMTC.

Specifically, the blind-demodulation result at block 202 may be classified into several types: (1) the synchronization signal is included in a subframe of the communication information and the short code of the SSS is 0 (indicating that the cell sends the communication information on any one of subframes 0~4 within the DMTC, or sends the communication information on subframe 0 that is outside the DMTC); (2) the synchronization signal is included in a subframe of the communication information and the short code of the SSS is 1 (indicating that the cell sends the communication information on any one of subframes 5~9 within the DMTC, or sends the communication information on subframe 5 that is outside the DMTC); (3) the synchronization signal is not detected in a subframe of the communication information.

At block 203, a reference subframe number of the communication information is determined according to the blind-demodulation result.

The reference subframe number determined at block 203 may be classified into several types: (1) when the synchronization signal is included in a subframe of the communication information and the short code of the SSS is 0, the reference subframe number is determined as 0; (2) when the synchronization signal is included in a subframe of the communication information and the short code of the SSS is 1, the reference subframe number is determined as 5; (3) when the synchronization signal is not detected in a subframe of the communication information, the reference subframe number is determined as a subframe number of the communication information, i.e., a current subframe number.

At block 204, a scrambling sequence of the CRS in the communication information is determined according to the reference subframe number.

In the embodiment of the present disclosure, the reference subframe number and the scrambling sequence are corresponding. For example, when the determined reference subframe number is x, the corresponding scrambling sequence is scrambling in the case of transmitting the CRS in subframe x.

At block 205, the CRS is demodulated according to the scrambling sequence.

In this way, after determining the scrambling sequence of the CRS, the scrambling sequence of the CRS may be learnt, thereby avoiding blindly demodulating the CRS using various scrambling assumptions, and reducing the complexity of demodulation.

In this case, channel estimation may be performed according to the determined scrambling sequence. The MulteFire physical broadcast channel (MF-PBCH), the PDCCH, and the PDSCH are received and demodulated using a result of the channel estimation.

In the demodulation method provided by the embodiment of the present disclosure, communication information of a cell is obtained, a synchronization signal in the communication information is blindly demodulated to obtain a blind-demodulation result, a reference subframe number of the communication information is determined according to the blind-demodulation result, a scrambling sequence of the CRS in the communication information is determined according to the reference subframe number, and the CRS is demodulated according to the scrambling sequence. In this way, the scrambling sequence of the CRS in the communication information is determined according to the obtained prior information, thereby reducing scrambling assumptions when demodulating the CRS, reducing demodulation complexity and power consumption.

Third Embodiment

Figure 3:
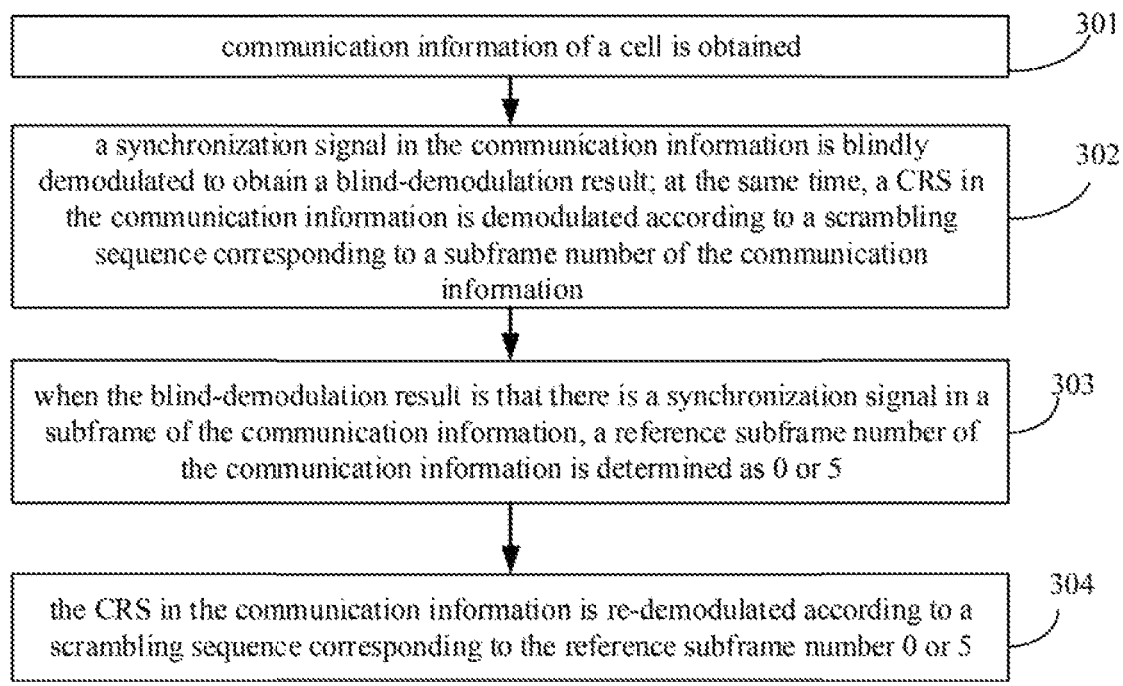
FIG. 3 is a flowchart illustrating a demodulation method according to a third embodiment of the present disclosure.

As shown in FIG. 3, the third embodiment of the present disclosure provides a demodulation method. The demodulation method includes operations at blocks 301 to 304, which are described in detail below.

At block 301, communication information of a cell is obtained.

In the embodiment of the present disclosure, the demodulation method is applied to, for example, a mobile phone terminal, a handheld device, a radio modem, etc., and may also be applied to other devices capable of transmitting or receiving radio signals. The communication information is information on an entire bandwidth obtained by a terminal operating in an unlicensed frequency band from the corresponding cell.

At block 302, a synchronization signal in the communication information is blindly demodulated to obtain a blind-demodulation result. At the same time, a CRS in the communication information is demodulated according to a scrambling sequence corresponding to a subframe number of the communication information.

In the embodiment of the present disclosure, the synchronization signal mainly includes a PSS, a SSS, an ePSS, and an eSSS. The synchronization signal may be part of the DRS, i.e., transmitted within the DMTC. When the synchronization signal is transmitted on subframes 0~4, a short code of the SSS is 0. When the synchronization signal is transmitted on subframes 5~9, the short code of the SSS is 1. The synchronization signal may also be transmitted on subframes 0 or 5 that are outside the DMTC.

Specifically, the blind-demodulation result at block 302 may be classified into several types: (1) the synchronization signal is included in a subframe of the communication information and the short code of the SSS is 0 (indicating that the cell sends the communication information on any one of subframes 0~4 within the DMTC, or sends the communication information on subframe 0 that is outside the DMTC); (2) the synchronization signal is included in a subframe of the communication information and the short code of the SSS is 1 (indicating that the cell sends the communication information on any one of subframes 5~9 within the DMTC, or sends the communication information on subframe 5 that is outside the DMTC); (3) the synchronization signal is not detected in a subframe of the communication information.

In this case, the scrambling sequence corresponding to the subframe number of the communication information is scrambling in the case of transmitting the CRS in a subframe of which a subframe number is the same as the subframe number of the communication information.

At block 303, when the blind-demodulation result is that there is a synchronization signal in a subframe of the communication information, a reference subframe number of the communication information is determined as 0 or 5.

In the embodiment of the present disclosure, when the synchronization signal is included in the subframe of the communication information and the short code of the SSS is 0, the reference subframe number is determined as 0. When the synchronization signal is included in a subframe of the communication information and the short code of the SSS is 1, the reference subframe number is determined as 5.

When the blind-demodulation result is that the synchronization signal is not detected in the subframe of the communication information, the demodulation is completed without subsequent processing.

At block 304, the CRS in the communication information is re-demodulated according to a scrambling sequence corresponding to the reference subframe number 0 or 5.

In this case, the scrambling sequence corresponding to the reference subframe number 0 or 5 is scrambling in the case of transmitting the CRS in subframe 0 or 5.

In the demodulation method provided by the embodiment of the present disclosure, communication information of a cell is obtained, a synchronization signal in the communication information is blindly demodulated to obtain a blind-demodulation result, a CRS in the communication information is demodulated according to a scrambling sequence corresponding to a subframe number of the communication information at the same time, when the blind-demodulation result is that there is a synchronization signal in a subframe of the communication information, a reference subframe number of the communication information is determined as 0 or 5, the CRS in the communication information is re-demodulated according to a scrambling sequence corresponding to the reference subframe number 0 or 5. In this way, scrambling assumptions when demodulating the CRS are reduced, demodulation time is reduced, and demodulation complexity and power consumption are reduced.

Fourth Embodiment

Figure 4:
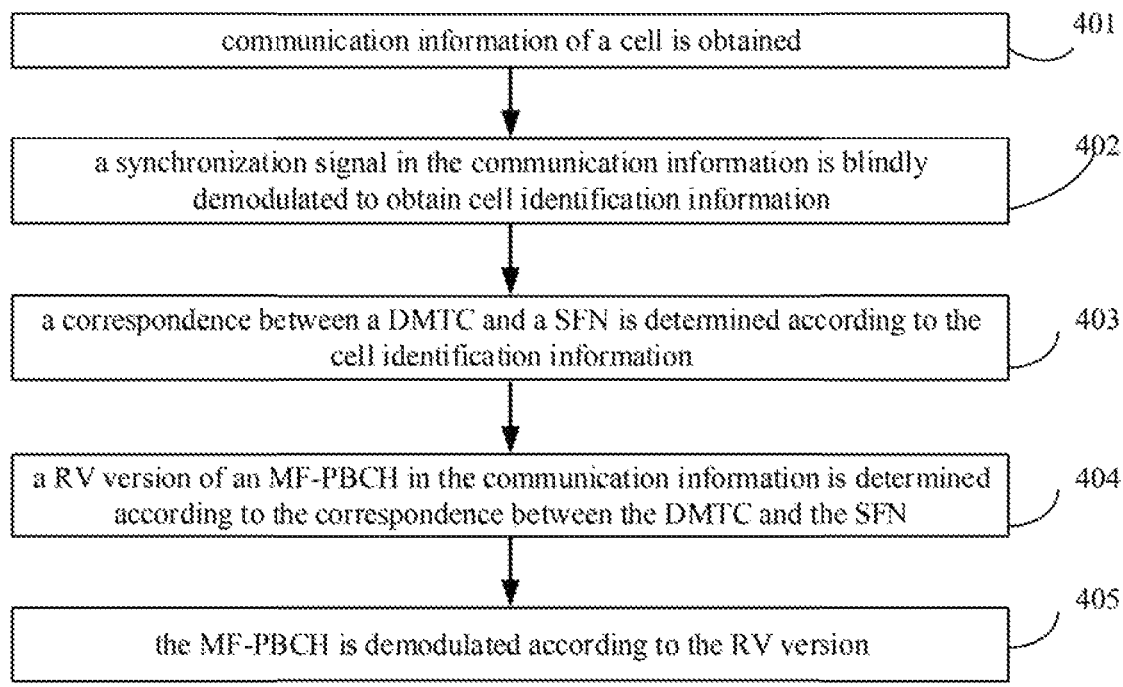
FIG. 4 is a flowchart illustrating a demodulation method according to a fourth embodiment of the present disclosure.

As shown in FIG. 4, the fourth embodiment of the present disclosure provides a demodulation method. The demodulation method includes operations at blocks 401 to 405, which are described in detail below.

At block 401, communication information of a cell is obtained.

In the embodiment of the present disclosure, the demodulation method is applied to, for example, a mobile phone terminal, a handheld device, a radio modem, etc., and may also be applied to other devices capable of transmitting or receiving radio signals. The communication information is information on an entire bandwidth obtained by a terminal operating in an unlicensed frequency band from the corresponding cell.

At block 402, a synchronization signal in the communication information is blindly demodulated to obtain cell identification information.

In the embodiment of the present disclosure, the synchronization signal mainly includes a PSS, a SSS, an ePSS, and an eSSS. The synchronization signal may be part of the DRS, i.e., transmitted within the DMTC. The synchronization signal may also be transmitted on subframe 0 that is outside the DMTC.

Specifically, the cell identification information may be, for example, a cell identifier (Cell ID), a PSS value, an SSS value, and the like, which is not limited by the present disclosure.

At block 403, a correspondence between a DMTC and a SFN is determined according to the cell identification information.

In the embodiment of the present disclosure, the correspondence between the DMTC and the SFN may be calculated using the cell identification information. For example, when the cell identification information is the Cell ID, a result of the Cell ID mod 4 (the remainder when the Cell ID is divided by 4) may be a result of the SFN mod 4, in which the SFN is a system frame number that DMTC may transmit.

For example, when the Cell ID is 11, then the Cell ID mod 4 is 3. Thus, the SFN mod 4 is 3. That is, the DMTC may be transmitted on the SFNs of 3, 7, 11, and the like.

At block 404, a RV version of an MF-PBCH in the communication information is determined according to the correspondence between the DMTC and the SFN.

In the embodiment of the present disclosure, there are four RV versions transmitted by the MF-PBCH: RV0, RV1, RV2, and RV3. When the cell transmits the MF-PBCH, a RV version of the MF-PBCH transmitted at the moment of SFN mod 4=x is RVx. As such, the RV version of the MF-PBCH may be determined according to the correspondence between the DMTC and the SFN.

For example, when the SFN mod 4 is 3, i.e., the DMTC may be transmitted on the SFNs of 3, 7, 11, and the like, the corresponding RV version of the MF-PBCH is RV3.

In addition, the MF-PBCH may also be transmitted on subframe 0 that is outside the DMTC.

At block 405, the MF-PBCH is demodulated according to the RV version.

In this way, after determining the RV version of the MF-PBCH, the RV version of the MF-PBCH transmitted within the DMTC may be learnt, thereby avoiding blindly demodulating the MF-PBCH using multiple RV versions, and reducing the complexity of demodulation.

Figure 5A:
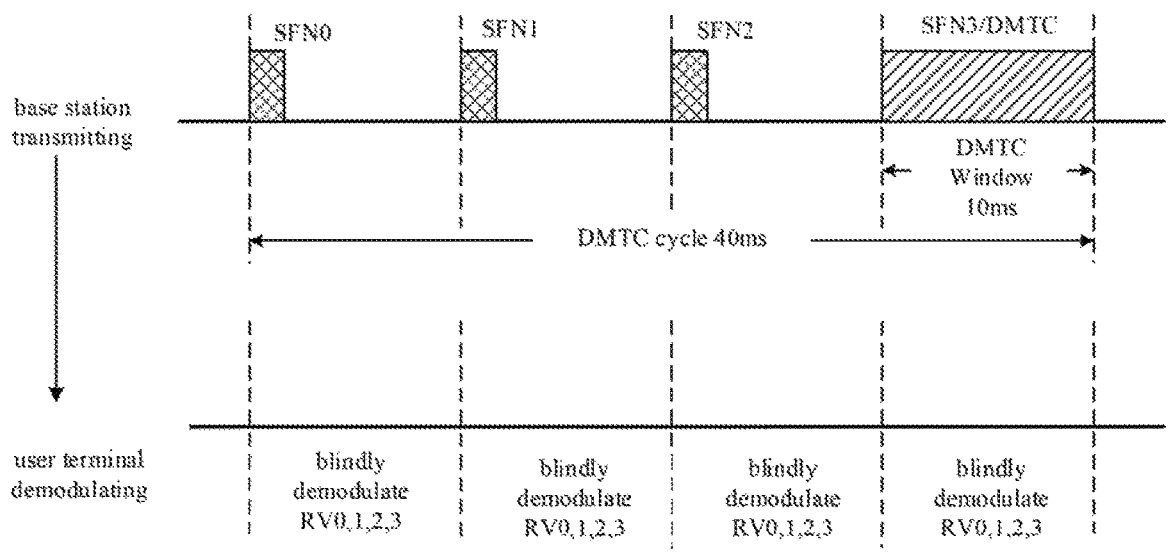
FIG. 5A is a schematic diagram illustrating blindly demodulating the MF-PBCH according to all RV versions in the related art.
Figure 5B:
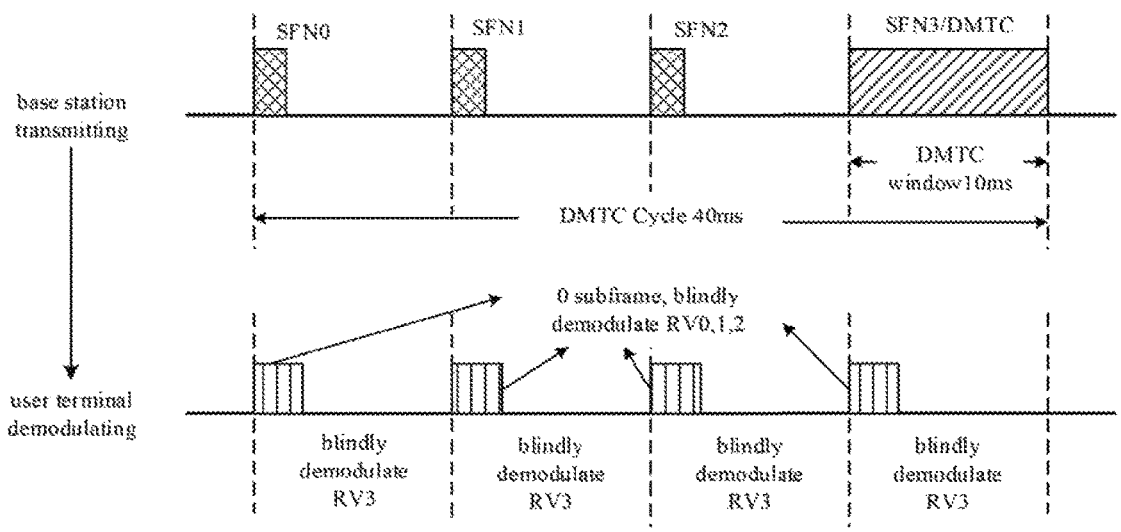
FIG. 5B is a schematic diagram illustrating blindly demodulating the MF-PBCH according to a determined RV version in the fourth embodiment of the present disclosure.

For example, after determining that the RV version is RV3, as shown in FIG. 5B, the MF-PBCH is blindly demodulated at all moments according to RV3, all RV versions are blindly demodulated on subframe 0. Compared to the demodulation mode as shown in FIG. 5A, RV version assumptions may be reduced.

In the demodulation method provided by the embodiment of the present disclosure, communication information of a cell is obtained, a synchronization signal in the communication information is blindly demodulated to obtain cell identification information, a correspondence between a DMTC and a SFN is determined according to the cell identification information, a RV version of the MF-PBCH in the communication information is determined according to the correspondence between the DMTC and the SFN, and the MF-PBCH is demodulated according to the RV version. In this way, the RV version of the MF-PBCH in the communication information is determined according to the obtained prior information, thereby reducing RV version assumptions when demodulating the MF-PBCH, reducing demodulation complexity and power consumption.

Fifth Embodiment

Figure 6:
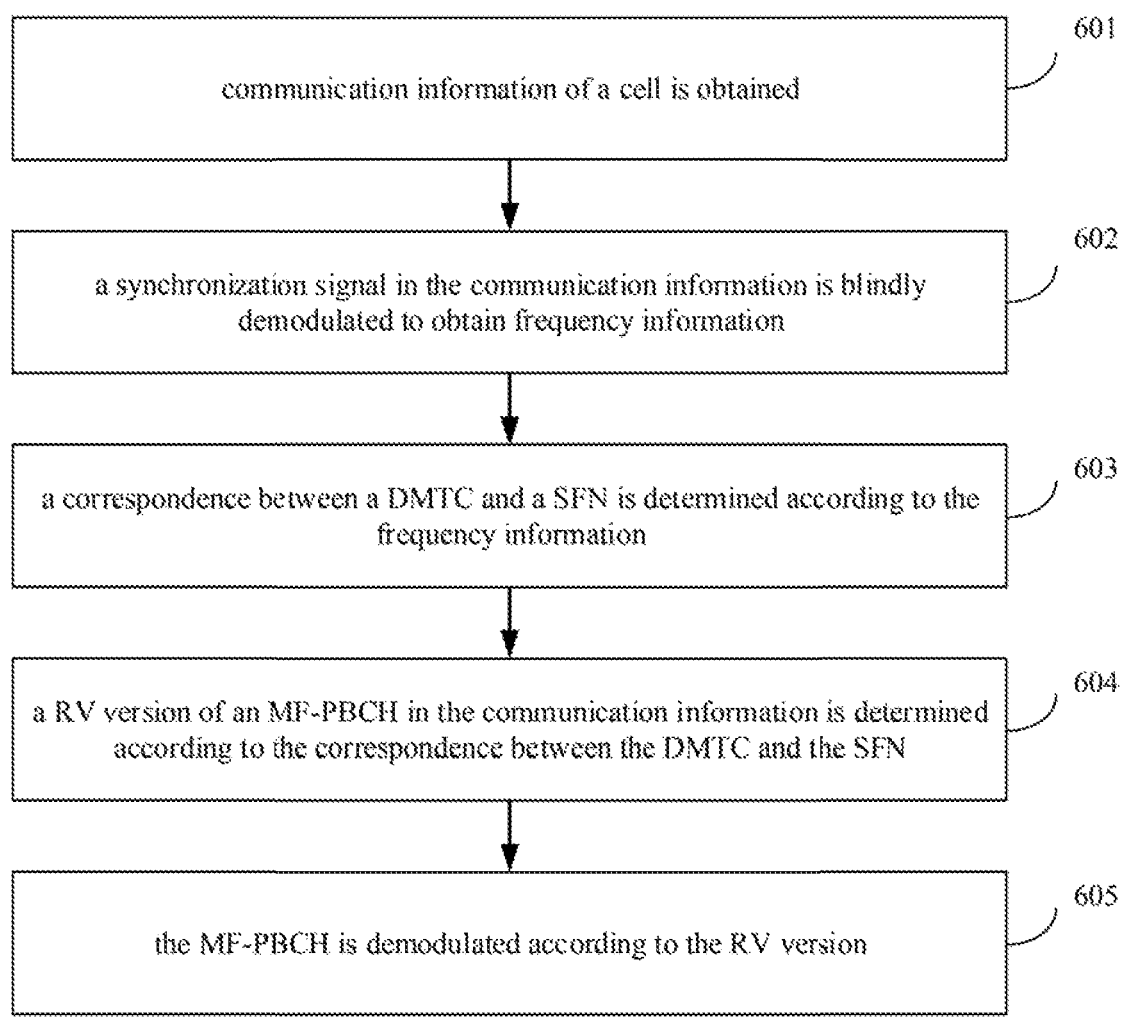
FIG. 6 is a flowchart illustrating a demodulation method according to a fifth embodiment of the present disclosure.

As shown in FIG. 6, the fifth embodiment of the present disclosure provides a demodulation method. The demodulation method includes operations at blocks 601 to 605, which are described in detail below.

At block 601, communication information of a cell is obtained.

In the embodiment of the present disclosure, the demodulation method is applied to, for example, a mobile phone terminal, a handheld device, a radio modem, etc., and may also be applied to other devices capable of transmitting or receiving radio signals. The communication information is information on an entire bandwidth obtained by a terminal operating in an unlicensed frequency band from the corresponding cell.

At block 602, a synchronization signal in the communication information is blindly demodulated to obtain frequency information.

In the embodiment of the present disclosure, the synchronization signal mainly includes a PSS, a SSS, an ePSS, and an eSSS. The synchronization signal may be part of the DRS, i.e., transmitted within the DMTC. The synchronization signal may also be transmitted on subframe 0 that is outside the DMTC.

Specifically, the frequency information may be, for example, a center frequency point (EARFCN) value, a center frequency value, a specific frequency value, a specific frequency offset, and the like, which are not limited by the present disclosure.

At block 603, a correspondence between a DMTC and a SFN is determined according to the frequency information.

In the embodiment of the present disclosure, the correspondence between the DMTC and the SFN may be calculated using the frequency information. For example, when the frequency information is the EARFCN value, a result of the EARFCN mod 4 (the remainder when the EARFCN is divided by 4) may be a result of the SFN mod 4, in which the SFN is a system frame number that DMTC may transmit.

For example, when the EARFCN is 11, then the EARFCN mod 4 is 3. Thus, the SFN mod 4 is 3. That is, the DMTC may be transmitted on the SFNs of 3, 7, 11, and the like.

At block 604, a RV version of an MF-PBCH in the communication information is determined according to the correspondence between the DMTC and the SFN.

In the embodiment of the present disclosure, there are four RV versions transmitted by the MF-PBCH: RV0, RV1, RV2, and RV3. When the cell transmits the MF-PBCH, a RV version of the MF-PBCH transmitted at the moment of SFN mod 4=x is RVx. As such, the RV version of the MF-PBCH may be determined according to the correspondence between the DMTC and the SFN.

For example, when the SFN mod 4 is 3, i.e., the DMTC may be transmitted on the SFNs of 3, 7, 11, and the like, the corresponding RV version of the MF-PBCH is RV3.

In addition, the MF-PBCH may also be transmitted on subframe 0 that is outside the DMTC.

At block 605, the MF-PBCH is demodulated according to the RV version.

In this way, after determining the RV version of the MF-PBCH, the RV version of the MF-PBCH transmitted within the DMTC may be learnt, thereby avoiding blindly demodulating the MF-PBCH using multiple RV versions, and reducing the complexity of demodulation.

For example, after determining that the RV version is RV3, as shown in FIG. 5B, the MF-PBCH is blindly demodulated at all moments according to RV3, all RV versions are blindly demodulated on subframe 0. Compared to the demodulation mode as shown in FIG. 5A, RV version assumptions may be reduced.

It should be noted that, the correspondence between the DMTC and the SFN may be determined according to a combination of the cell identification information and the frequency information in addition to the cell identification information in the fourth embodiment or the frequency information in the fifth embodiment, so as to improve accuracy.

In the demodulation method provided by the embodiment of the present disclosure, communication information of a cell is obtained, a synchronization signal in the communication information is blindly demodulated to obtain frequency information, a correspondence between a DMTC and a SFN is determined according to the frequency information, a RV version of an MF-PBCH in the communication information is determined according to the correspondence between the DMTC and the SFN, and the MF-PBCH is demodulated according to the RV version. In this way, the RV version of the MF-PBCH in the communication information is determined according to the obtained prior information, thereby reducing RV version assumptions when demodulating the MF-PBCH, reducing demodulation complexity and power consumption.

Sixth Embodiment

Figure 7:
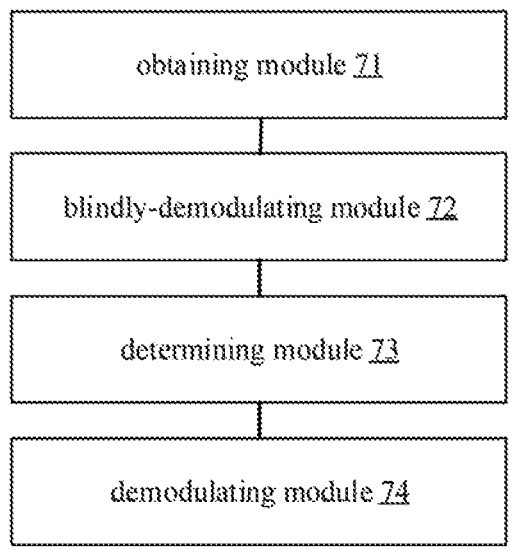
FIG. 7 is a schematic diagram illustrating structure of a demodulation device according to a sixth embodiment of the present disclosure.

FIG. 7 is a schematic diagram illustrating structure of a demodulation device according to the sixth embodiment of the present disclosure. The demodulation device includes:

an obtaining module 71, configured to obtain communication information of a cell;

a blindly-demodulating module 72, configured to blindly demodulate a synchronization signal in the communication information to obtain a blind-demodulation result;

a determining module 73, configured to determine time range information carried by the communication information according to the blind-demodulation result; and a demodulating module 74, configured to demodulate the communication information according to the time range information.

In this case, the time range information includes a reference subframe number.

The demodulating module further includes:

a first determining unit, configured to determine a scrambling sequence of a CRS in the communication information according to the reference subframe number; and a first demodulating unit, configured to demodulate the CRS according to the scrambling sequence.

The blind-demodulation result may be at least one of cell identification information and frequency information.

When the blind-demodulation result is the cell identification information, the determining module is configured to determine a correspondence between a DMTC and a SFN according to the cell identification information.

Alternatively, when the blind-demodulation result is the frequency information, the determining module is configured to determine the correspondence between the DMTC and the SFN according to the frequency information.

Alternatively, when the blind-demodulation result is the cell identification information and the frequency information, the determining module is configured to determine the correspondence between the DMTC and the SFN according to the cell identification information and the frequency information.

The demodulating module further includes:

a second determining unit, configured to determine a RV version of an MF-PBCH in the communication information according to the correspondence between the DMTC and the SFN; and a second demodulating unit, configured to demodulate the MF-PBCH according to the RV version.

In addition, an embodiment of the present disclosure further provides a terminal, which includes the above-described demodulation device.

The device embodiment of the present disclosure is a device corresponding to the embodiments of the foregoing method. All implementation means in the foregoing method embodiments are applicable to the embodiment of the device, and the same technical effect may be achieved.

Seventh Embodiment

Figure 8:
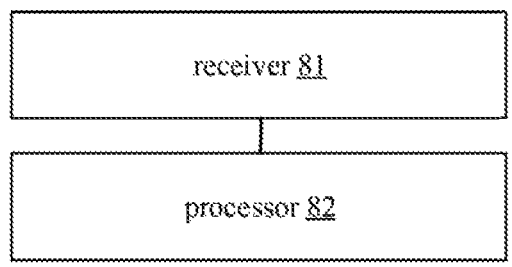
FIG. 8 is a schematic diagram illustrating structure of a demodulation system according to a seventh embodiment of the present disclosure.

FIG. 8 is a schematic diagram illustrating structure of a demodulation system according to the seventh embodiment of the present disclosure. The demodulation system includes:

a receiver 81, configured to obtain communication information of a cell; and a processor 82 connected with the receiver, configured to blindly demodulate a synchronization signal in the communication information to obtain a blind-demodulation result, determine time range information carried by the communication information according to the blind-demodulation result, and demodulate the communication information according to the time range information.

The demodulation system may implement the functions realized by all of modules in the above-described device embodiments, and may achieve the same technical effects as those of the above-described device embodiments.

The basic principles of the present disclosure are described above with reference to the embodiments. It should be noted that those skilled in the art can understand that all or any of the steps or components of the methods and devices of the present disclosure may be implemented in hardware, firmware, software, or a combination thereof, in any computing device (including a processor, a storage medium, etc.) or a network of the computing device, which can be achieved by those skilled in the art using their basic programming skills in the case of viewing the teachings of the present disclosure.

Thus, the objects of the present disclosure can also be achieved by running a program or a set of programs on any computing device. The computing device can be a well-known general purpose device. Accordingly, the objects of the present disclosure may also be realized by merely providing a program product including program codes for implementing the method or device of the present disclosure. That is to say, such a program product also constitutes the present disclosure, and a storage medium storing such a program product also constitutes the present disclosure. It is obvious that the storage medium may be any known storage medium or any storage medium developed in the future. It should also be noted that in the device and method of the present disclosure, it is apparent that various components or steps may be decomposed and/or recombined. These decompositions and/or recombinations should be considered as equivalents to the present disclosure. Also, the steps of performing the above-described series of processing may naturally be performed in an illustrated chronological order, but may not necessarily be performed in the chronological order. Certain steps may be performed in parallel or independently with each other.

A1. A demodulation method, including:

obtaining communication information of a cell;

blindly demodulating a synchronization signal in the communication information to obtain a blind-demodulation result;

determining time range information carried by the communication information according to the blind-demodulation result; and demodulating the communication information according to the time range information.

A2. The method of A1, wherein the time range information includes a reference subframe number.

A3. The method of A2, wherein the demodulating the communication information according to the time range information includes:

determining a scrambling sequence of a Cell Reference Signal (CRS) in the communication information according to the reference subframe number; and demodulating the CRS according to the scrambling sequence.

A4. The method of A1, wherein the blind-demodulation result is at least one of cell identification information and frequency information.

A5. The method of A4, wherein the determining the time range information carried by the communication information according to the blind-demodulation result includes:

when the blind-demodulation result is the cell identification information, determining a correspondence between a Discovery Reference Signal (DRS) Transmission Window (DMTC) and a System Frame Number (SFN) according to the cell identification information; or, when the blind-demodulation result is the frequency information, determining the correspondence between the DMTC and the SFN according to the frequency information; or, when the blind-demodulation result is the cell identification information and the frequency information, determining the correspondence between the DMTC and the SFN according to the cell identification information and the frequency information.

A6. The method of A5, wherein the demodulating the communication information according to the time range information includes: determining a redundant (RV) version of an MulteFire Physical Broadcast Channel (MF-PBCH) in the communication information according to the correspondence between the DMTC and the SFN; and demodulating the MF-PBCH according to the RV version.

A7. A demodulation device, including: an obtaining module, configured to obtain communication information of a cell; a blindly-demodulating module, configured to blindly demodulate a synchronization signal in the communication information to obtain a blind-demodulation result; a determining module, configured to determine time range information carried by the communication information according to the blind-demodulation result; and a demodulating module, configured to demodulate the communication information according to the time range information.

A8. The demodulation device of A7, wherein the time range information includes a reference subframe number.

A9. The demodulation device of A8, wherein the demodulating module further includes: a first determining unit, configured to determine a scrambling sequence of a Cell Reference Signal (CRS) in the communication information according to the reference subframe number; and a first demodulating unit, configured to demodulate the CRS according to the scrambling sequence.

A10. The demodulation device of A7, wherein the blind-demodulation result is at least one of cell identification information and frequency information.

A11. The demodulation device of A10, wherein when the blind-demodulation result is the cell identification information, the determining module is configured to determine a correspondence between a Discovery Reference Signal (DRS) Transmission Window (DMTC) and a System Frame Number (SFN) according to the cell identification information; or, when the blind-demodulation result is the frequency information, the determining module is configured to determine the correspondence between the DMTC and the SFN according to the frequency information; or, when the blind-demodulation result is the cell identification information and the frequency information, the determining module is configured to determine the correspondence between the DMTC and the SFN according to the cell identification information and the frequency information.

A12. The demodulation device of A11, wherein the demodulating module further includes: a second determining unit, configured to determine a redundant (RV) version of an MulteFire Physical Broadcast Channel (MF-PBCH) in the communication information according to the correspondence between the DMTC and the SFN; and a second demodulating unit, configured to demodulate the MF-PBCH according to the RV version.

A13. A terminal including the demodulation device described in any of the preceding A7 to A12.

A14. A demodulation system, including: a receiver, configured to obtain communication information of a cell; and a processor connected with the receiver, configured to blindly demodulate a synchronization signal in the communication information to obtain a blind-demodulation result, determine time range information carried by the communication information according to the blind-demodulation result, and demodulate the communication information according to the time range information.

What is claimed is:

1. A demodulation method, comprising:
   obtaining communication information of a cell;
   blindly demodulating a synchronization signal in the communication information to obtain a blind-demodulation result;
   determining time range information carried by the communication information according to the blind-demodulation result; and
   demodulating the communication information according to the time range information;
   wherein the time range information comprises a reference subframe number.

2. The method of claim 1, wherein the demodulating the communication information according to the time range information comprises:
   determining a scrambling sequence of a Cell Reference Signal (CRS) in the communication information according to the reference subframe number; and
   demodulating the CRS according to the scrambling sequence.

3. The method of claim 1, wherein the blind-demodulation result is at least one of cell identification information and frequency information.

4. The method of claim 3, wherein the determining the time range information carried by the communication information according to the blind-demodulation result comprises:
   when the blind-demodulation result is the cell identification information, determining a correspondence between a Discovery Measurement Timing Configuration(DMTC) and a System Frame Number (SFN) according to the cell identification information;
   or,
   when the blind-demodulation result is the frequency information, determining the correspondence between the DMTC and the SFN according to the frequency information;

or,
when the blind-demodulation result is the cell identification information and the frequency information, determining the correspondence between the DMTC and the SFN according to the cell identification information and the frequency information.

5. The method of claim 4, wherein the demodulating the communication information according to the time range information comprises:
determining a redundant (RV) version of an MulteFire Physical Broadcast Channel (MF-PBCH) in the communication information according to the correspondence between the DMTC and the SFN; and
demodulating the MF-PBCH according to the RV version.

6. A demodulation system, comprising:
a receiver, configured to obtain communication information of a cell; and
a processor connected with the receiver, configured to blindly demodulate a synchronization signal in the communication information to obtain a blind-demodulation result, determine time range information carried by the communication information according to the blind-demodulation result, and demodulate the communication information according to the time range information;
wherein the blind-demodulation result is at least one of cell identification information and frequency information.

7. The demodulation system of claim 6, wherein the determining the time range information carried by the communication information according to the blind-demodulation result comprises:
when the blind-demodulation result is the cell identification information, determining a correspondence between a Discovery Measurement Timing Configuration(DMTC) and a System Frame Number (SFN) according to the cell identification information;
or,
when the blind-demodulation result is the frequency information, determining the correspondence between the DMTC and the SFN according to the frequency information;
or,
when the blind-demodulation result is the cell identification information and the frequency information, determining the correspondence between the DMTC and the SFN according to the cell identification information and the frequency information.

8. The demodulation system of claim 7, wherein the demodulating the communication information according to the time range information comprises:
determining a redundant (RV) version of an MulteFire Physical Broadcast Channel (MF-PBCH) in the communication information according to the correspondence between the DMTC and the SFN; and
demodulating the MF-PBCH according to the RV version.

9. A demodulation device, comprising:
an obtaining module, configured to obtain communication information of a cell;
a blindly-demodulating module, configured to blindly demodulate a synchronization signal in the communication information to obtain a blind-demodulation result;
a determining module, configured to determine time range information carried by the communication information according to the blind-demodulation result; and
a demodulating module, configured to demodulate the communication information according to the time range information;
wherein the time range information comprises a reference subframe number.

10. The demodulation device of claim 9, wherein the blind-demodulation result is at least one of cell identification information and frequency information.

11. The demodulation device of claim 10, wherein when the blind-demodulation result is the cell identification information, the determining module is configured to determine a correspondence between a discovery measurement timing configuration (DMTC) and a System Frame Number (SFN) according to the cell identification information;
or,
when the blind-demodulation result is the frequency information, the determining module is configured to determine the correspondence between the DMTC and the SFN according to the frequency information;
or,
when the blind-demodulation result is the cell identification information and the frequency information, the determining module is configured to determine the correspondence between the DMTC and the SFN according to the cell identification information and the frequency information.

12. The demodulation device of claim 11, wherein the demodulating module further comprises:
a second determining unit, configured to determine a redundant (RV) version of an MulteFire Physical Broadcast Channel (MF-PBCH) in the communication information according to the correspondence between the DMTC and the SFN; and
a second demodulating unit, configured to demodulate the MF-PBCH according to the RV version.

13. A terminal comprising the demodulation device claimed in claim 9.

14. The demodulation device of claim 1, wherein the demodulating module further comprises:
a first determining unit, configured to determine a scrambling sequence of a Cell Reference Signal (CRS) in the communication information according to the reference subframe number; and
a first demodulating unit, configured to demodulate the CRS according to the scrambling sequence.

* * * * *